L. J. HOUZE.
PROCESS OF MANUFACTURING AND TEMPERING GLASS ARTICLES.
APPLICATION FILED OCT. 2, 1912.

1,107,072. Patented Aug. 11, 1914.

WITNESSES
Chas. Josterman
Elbert L. Hyde

INVENTOR
Leon J. Houze
By Fred'k W. Winter,
Attorney

UNITED STATES PATENT OFFICE.

LEON J. HOUZE, OF POINT MARION, PENNSYLVANIA.

PROCESS OF MANUFACTURING AND TEMPERING GLASS ARTICLES.

1,107,072.  Specification of Letters Patent.  Patented Aug. 11, 1914.

Application filed October 2, 1912. Serial No. 723,586.

*To all whom it may concern:*

Be it known that I, LEON J. HOUZE, a resident of Point Marion, in the county of Fayette and State of Pennsylvania, have invented a new and useful Improvement in Processes of Manufacturing and Tempering Glass Articles, of which the following is a specification.

This invention relates to a process of manufacturing and tempering or annealing glass articles, and particularly convex lights of glass such as are used for pictures, clocks, automobile lamps and the like.

The object of the invention is to provide an improved process which can be carried on at low expense and minimum labor cost, and which reduces the amount of apparatus and the standing investment required in a plant for manufacturing the same.

The invention comprises the several method steps hereinafter described and claimed.

Figure 1:
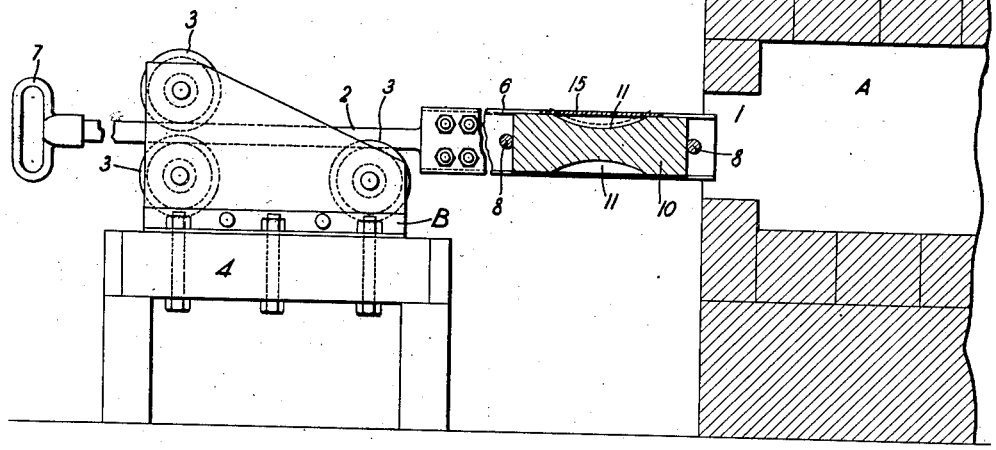
Figure 2:
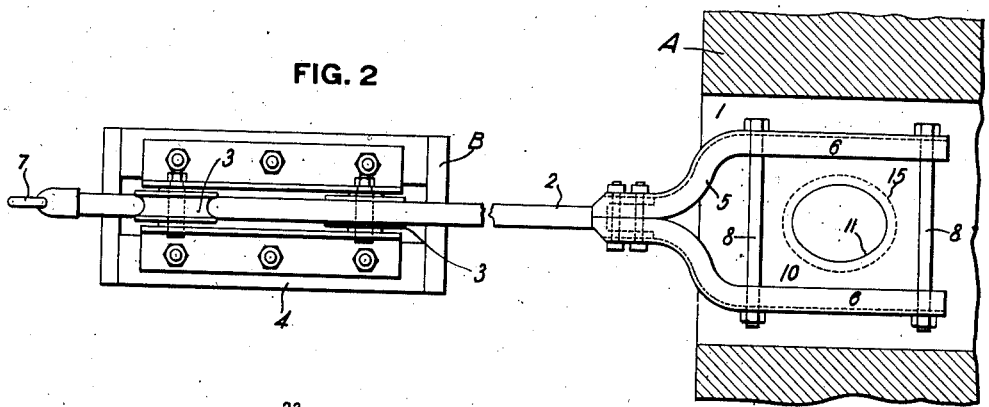
Figure 4:
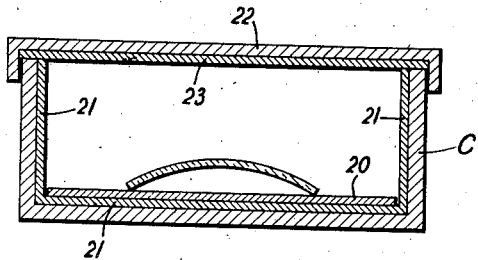
Figure 3:
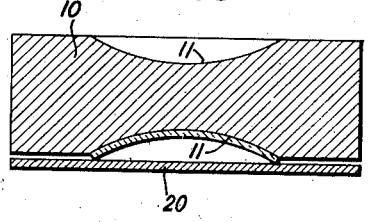

In the drawings Figure 1 represents an elevation, partly in section, of a furnace and car or buggy suitable for carrying out some of the steps of my method; Fig. 2 is a plan view of the same with the top of the furnace removed, and showing a mold in place therein; Fig. 3 is a detail sectional view, showing the mold inverted; and Fig. 4 is a sectional elevation of the annealing box with a molded article therein.

In forming articles of glass, such as circular or oval disks for picture frames, clocks, automobile lamps, etc., it has heretofore been the practice to use a furnace or heating apparatus having two connected chambers or rooms maintained at different temperatures and having the second thereof communicating with a leer, having an endless chain or belt therein. The blanks are placed upon molds, usually formed of iron, in the first heating chamber and after they have become sufficiently heated to assume the shape of the mold, the mold and the article therein are moved to the second or cooling chamber where they are allowed to remain until the article solidifies and cools to the temperature of the cooling chamber. The articles, while still in the cooling chamber, are then lifted from the molds by means of iron tools and are placed upon the endless belt or chain which slowly traverses the leer and carries the articles to the discharge end thereof from which they are removed. This method is unnecessarily expensive since all the manipulation of the articles takes place within the heating chambers and the apparatus is costly and involves considerable standing investment. The process is also slow and the labor arduous. Moreover, the molded articles are liable to be injured by the tools used in removing them to the leer and many are either broken, marred or otherwise damaged thereby.

According to my improved method the articles are handled entirely outside of the furnace or oven, thereby avoiding breakage or injury and reducing the cost. In the practice of my method I utilize molds which are formed of a suitable composition material which has the property of retaining heat for a considerable length of time. Various compositions having this characteristic are well known, those commonly used containing a considerable percentage of fire clay. A mold is formed of such material in the proper size and shape, usually in the form of a rectangular block, say 18x24" and 3" thick. One or both flat surfaces of this block are provided with one or more depressions or cavities of the shape of the finished article. Disks or blanks of glass of suitable size and shape are then formed and placed in position upon the mold block above the depressions or cavities therein. The mold is then introduced into a suitable heating furnace of any preferred type and in any convenient manner, either by hand or by means of a suitable car or buggy. The mold is allowed to remain in the heating chamber until the glass-blanks placed thereon soften sufficiently to assume by gravity the shape of the mold depressions or cavities. The mold is then withdrawn from the heating chamber with the formed articles therein and a sheet or tray of asbestos of proper thickness is laid upon its upper flat surface. The material of which the mold is made retains its heat for a long time and prevents sudden chilling of the glass and the setting up of internal strains and stresses therein, which might result in ultimate breakage. The mold is now inverted to cause the glass articles to drop out upon the asbestos sheet. This is then placed by hand or otherwise, in a self-contained annealing or tempering box of suitable size and shape. This box is preferably formed so that it can be sealed up air-tight so that there will be no contact of the outside air with the glass article being annealed or tempered. The annealing box with the articles therein is then set aside for a suitable length of time or until the articles have been properly tempered or annealed.

In the drawings, which represent somewhat diagrammatically suitable apparatus for carrying out the method, A represents a heating furnace or oven which may be of any form and dimensions and is provided with the usual door or opening 1 therein.

B represents a car or buggy comprising a long rod or pipe 2 mounted to slide in suitable rollers or wheels 3 on a platform 4 outside of the furnace and in front of the door thereof. One end of the rod or pipe 2 is provided with a fork 5 formed of channel irons 6 which form a support for the mold. The other end of the rod or pipe is provided with a handle 7 so that the car or buggy and mold carried thereon may be readily inverted or turned over in the rollers 3 when desired.

The mold comprises a block 10, shown as rectangular in shape and provided with one or more mold cavities or depressions 11 in its flat surface. This block is secured between the channel irons 6 by tie rods or bolts 8. Suitable blanks 15 are laid upon the flat upper surface of the mold over the depressions or cavities 11 therein, as indicated by the full lines, Fig. 1. The car or buggy B is moved longitudinally in the rollers 3 to insert the mold into the furnace or oven, as indicated in Fig. 2. The mold is allowed to remain in the furnace or heating chamber until the glass softens and by gravity sinks and assumes the shape of the depression or cavity 11, as indicated in dotted lines Fig. 1. When this occurs, the car or buggy B is rolled away to withdraw the mold from the furnace. An asbestos sheet or tray 20, is then laid upon the upper surface of the mold, which is immediately inverted to the position shown in Fig. 3, to discharge the molded articles, by gravity upon the tray. The tray with the article thereon is then placed in an annealing or tempering box C. This box may be formed of any suitable material and in any manner, but is preferably made of wood and is provided with a fireproof or asbestos lining 21. The cover 22 is formed to tightly fit the body of the box and is provided with a fireproof or asbestos lining 23. The annealing box when closed is air-tight and the asbestos lining thereof is made of such thickness as to retard the radiation of the heat of the molded articles therefrom. The boxes C can be made of different shape so as to readily accommodate articles of different sizes or shapes. The molded articles lying upon the tray having been introduced into the annealing box C, the latter is closed and set aside for a suitable period of time, to allow the glass articles to gradually cool and anneal. If desired, depressions or cavities 11 may be formed in both faces or surfaces of the mold 10, which are used alternately, thus obviating inversion of the mold between successive operations.

The apparatus necessary to carry out my improved method is considerably less than that required according to former methods. It involves but a single heating chamber or room, and the expense of maintaining this at the proper temperature is considerably less than required for heating the plurality of chambers required according to former practice. The method also dispenses entirely with the usual annealing chamber or leer and endless carrier therein and the cost of maintaining such chamber or leer at the proper temperature and operating the carrier. Each of the annealing boxes is in effect a self-contained annealing chamber and they can be built in quantities to suit the needs of any plant and at very low cost. The invested capital is also very materially reduced and all the labor and manipulation of the blanks and formed articles is carried on outside of the furnace, thereby avoiding breakage.

It will of course be understood that the invention is not limited to the particular form of apparatus shown. Any apparatus suitable for carrying on the method is within the scope of my invention.

What I claim is:—

The process of manufacturing convex lights of glass, consisting in placing a glass blank upon a mold, introducing said mold and blank into a heating furnace to thereby cause the blank to soften and assume the shape of the mold, removing said mold and the formed light of glass from the furnace, placing a tray formed of heat retaining material over said mold and inverting the mold to cause the formed article to be discharged from the mold upon said tray, and annealing the formed light of glass while on said tray by retarding the escape of its contained heat.

In testimony whereof, I have hereunto set my hand.

LEON J. HOUZE.

Witnesses:
W. T. Devlin,
W. S. Dillinger.